(12) United States Patent
Evrard et al.

(10) Patent No.: US 6,944,656 B2
(45) Date of Patent: Sep. 13, 2005

(54) SYSTEM AND METHOD FOR COVERT MANAGEMENT OF PASSIVE NETWORK DEVICES

(75) Inventors: Phillipe Evrard, Lasne (BE); Olivier Naveau, Laeken (BE); Stéphane Nasdrovisky, Laeken (BE); Olivier Dubois, Braine l'Alleud (BE)

(73) Assignee: Ip-Tap UK, Cambridge (GB)

( * ) Notice: Subject to any disclaimer, the term of this patent is extended or adjusted under 35 U.S.C. 154(b) by 778 days.

(21) Appl. No.: 10/050,779

(22) Filed: Jan. 18, 2002

(65) Prior Publication Data

US 2003/0140130 A1 Jul. 24, 2003

(51) Int. Cl.$^7$ .............................................. G06F 15/173
(52) U.S. Cl. ....................... 709/223; 709/202; 709/224; 709/238; 709/239; 713/200; 713/201; 713/190
(58) Field of Search ................................. 709/202, 203, 709/223–224, 242–243, 238–239; 713/200–202, 155, 161, 168, 190; 370/236.1; 379/9.02; 455/424; 340/853.2; 710/15; 714/16

(56) References Cited

U.S. PATENT DOCUMENTS 6,145,001 A * 11/2000 Scholl et al. ............... 709/223

6,266,704 B1  7/2001  Reed et al.

OTHER PUBLICATIONS

Distributed Network Management By HTTP–Based Remote Invocation, Global Telecommunications Conference—Globecom '99, vol. 3, Dec. 5, 1999, pp. 1889–1893, XP010373743, Hwa–Chun Lin et al.

* cited by examiner

Primary Examiner—Beatriz Prieto
Assistant Examiner—Hieu Le
(74) Attorney, Agent, or Firm—Jacobson Holman PLLC (57) ABSTRACT

A system and method for covertly managing passive network devices from a local or remote management center. A standard IP-based conversation established over a data network between two or more partner devices occurs in a first communication channel. Transparent passive network devices listen to the network traffic passing on the data network to which they are connected and extract their management information from this traffic. By generating protocol data units (PDU's) imitating those sent by the intended nodes, the reverse direction of the management traffic may be implemented.

17 Claims, 6 Drawing Sheets

SYSTEM AND METHOD FOR COVERT MANAGEMENT OF PASSIVE NETWORK DEVICES

BACKGROUND OF THE INVENTION

1. Field of the Invention

The present invention is related to the field of data network security and, more particularly, to a system and method for covertly managing passive network devices from a remote location.

2. Description of the Related Art

The emergence of Internet commerce has forced large organizations to connect their internal networks to public networks, with the resulting increase in risk being inevitable. The security industry progressively provides the procedures, tools and countermeasures to respond to this increased risk. Security solutions may be broadly categorized as active or passive.

Network devices are active if they are required to set up a functional infrastructure and may include, among others, access control (firewalls), content filtering (anti-virus), and strong authentication (radius). Conversely, network devices which are not required to set up a functional infrastructure are passive and are typically used to build a second line of defense. Passive devices include, for example, intrusion detection and network scanning.

Two tools commonly used by organizations to obtain network security include the firewall as an active component, and intrusion detection as a passive component.

The firewall is an active component in that it affirmatively decides, for each inbound or outbound packet, whether the packet is to be accepted or dropped. The firewall is located at a key point of the network, meaning a point where all the traffic from/to the public network can be controlled. However, while the firewall is an important piece of network security, it remains vulnerable for at least three reasons. First, firewalls are not immune to network attacks hidden in legitimate packets; half-open connection attack, resulting from a protocol flow, or packet fragmentations are two better known examples. Second, firewalls, like other software implementations, are not immune to software bugs. Third, firewalls are administered by security administrators who can make mistakes or who may be inadequately trained to fulfill their function.

For at least these reasons, the firewall itself needs to be protected. Like any other protection device, a firewall cannot resist assault indefinitely and thus is vulnerable if an alert is not triggered within a defined period of time. Hence, intrusion detection systems are used to provide such alerts.

Intrusion-detection systems may be either host-based or network-based. Host-based intrusion detection systems are installed on servers and monitor important system resources like files, processes and system activity. Network-based intrusion-detection systems are connected to key points of the network and monitor traffic from/to public networks.

To protect themselves against potential intruders, some passive network devices need to remain hidden. This means that while they are physically connected to the network and able to tap any network traffic, they do not answer to any kind of request. Network-based intrusion detection systems are often invisible, meaning that the network interface card (NIC) on which they capture the network traffic has its communication stack disabled. Disabling the communication stack is the absolute protection guarantee against attacks coming from the network and should be a requirement for a passive device that must remain uncompromised.

Problems arise when hidden passive network devices need to be managed from a remote location. Most network-based devices need to be administered from or communicate with a management center. To do so, the device uses either forged packets that are pushed on the local network or an additional NIC connected to the internal network with standard IP-based traffic used to communicate with the management server. Both of these methods annihilate the protection guarantee offered by a passive device; in the first case, the management center could be compromised, in which case resulting effects are unpredictable and, in the second case, the internal network is a perfect backdoor.

Accordingly, a need exists for a method allowing passive network devices to be covertly managed from a remote location.

SUMMARY OF THE INVENTION

In view of the foregoing, one object of the present invention is to overcome the difficulties of managing passive network devices from a remote location without compromising the management center through the use of partner devices for passive network devices.

Another object of the present invention is to establish a standard IP-based conversation between two or more partner devices as a first communication channel that can then be used by passive network devices to create a second communication channel allowing such devices to communicate.

A further object of the invention is to establish a system in which a passive network device listens to network traffic intended for another recipient and extracts necessary management information from such traffic.

A still further object of the invention is to enable a passive network device to generate protocol data units (PDU's) imitating those sent by a cooperating node in order to implement the reverse direction of management traffic.

Another object of the invention to is provide a system and method in which neither the management center nor the passive network devices are directly addressable on the network but instead require a third party in order to communicate with one another.

Yet another object of the invention is to establish a covert management channel between a management center and a passive network device using a standard communication channel established between two third parties.

In accordance with this and other objects, the present invention is directed to a system and method for covertly managing passive network devices from a local or remote management center. A standard IP-based conversation established over a data network between two or more partner devices occurs in a first communication channel. The passive network devices listen to the network traffic passing on the data network to which they are connected. While the traffic is not intended for the passive network devices, but rather is being passed between the partner and cooperating devices, the passive network devices are able to extract their management information from this traffic and, through generation of protocol data units (PDU's) imitating those sent by the intended nodes, implement the reverse direction of the management traffic. Using a communication channel set up between third parties to enable communication, neither the management center nor the passive network devices are directly addressable on the network, instead being "transparent" to the network. Traffic exchanges are signed and encrypted in order to provide standard authentication, privacy and integrity.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
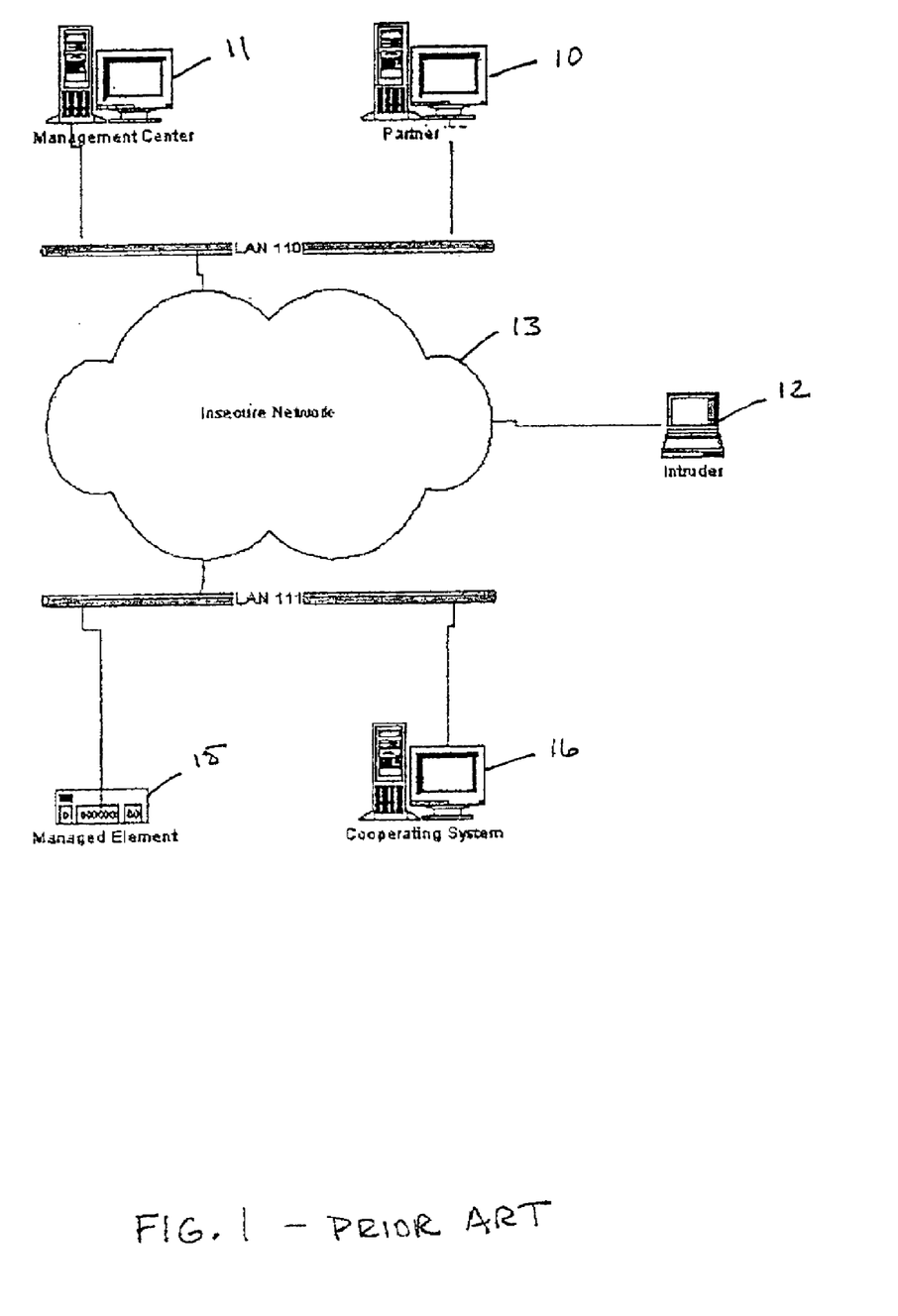
FIG. 1 illustrates a typical network topology according to the prior art.

A typical network topology according to the prior art is depicted in FIG. 1. The devices involved in the covert management method are all connected on the insecure network 13 through a local area network (LAN) 110, 111. As used herein, "device" is used to refer to a standard computer hardware arrangement running an operating system (OS) and a set of applications, and including a network interface card (NIC) required by the network connection. The insecure network 13 may be the Internet through which an intruder 12 gains access to the LANs 110, at 111.

As shown, the devices may include a partner 10, a management center 11, a managed element 15 and a cooperating system 16. The managed element 15, to be remotely managed by the management center 11, includes passive network devices. The partner 10 and cooperating system 16 represent communication nodes on the network between which information is passed. These two devices establish an IP-based communication with one another. According to the transport and application pair that is selected for this particular communication, different scenarios are possible. For example, the partner 10 can send a stateless (UDP, ICMP) packet to the cooperating system 16; the partner 10 can establish a stateful (TCP) connection to the cooperating system 16; the cooperating system 16 can send a stateless (UDP, ICMP) packet to the partner 10; or the cooperating system 16 can establish a stateful (TCP) connection to partner 10.

The management center 11 and the managed element 15 are invisible in order to protect themselves from external attacks which could be performed by the potential intruder 12. This implies that the management center 11 and the managed element 15, respectively connected to LAN 110 and LAN 111, have their network interface card (NIC) set in promiscuous mode to capture any traffic circulating on their respective networks. However, their data, network and transport layers have been configured in such a way that they do not give away any information, e.g., ARP response, broadcast, etc., that could reveal their presence. This having been said, there is no way, a priori, that the management center 11 and the managed element 15 can communicate management information to each other.

Figure 2:
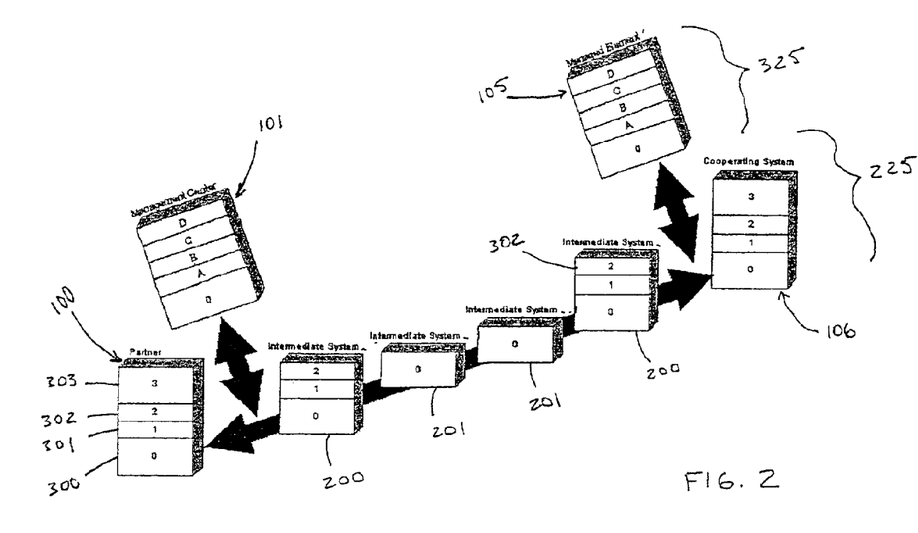
FIG. 2 illustrates the two distinct communication channels in accordance with the present invention.

In order to address this problem, and according to a preferred embodiment of the present invention illustrated in FIG. 2, a covert management channel, or second communication channel 325, is established between the management center 101 and the managed element 105 using a standard communication channel, or first communication channel 225, established between partner 100 and cooperating system 106. As noted earlier, the managed element 15, to be remotely managed by the management center 11, includes a passive network device. The partner 100 and cooperating system 106 represent communication nodes on the network between which information is passed. These two devices establish an IP-based communication with one another using the standard communication channel.

The standard communication channel represents the first communication channel 225 which is a standard IP peer-to-peer communication. Partner 100 and cooperating system 106 communicate through a set of intermediate systems. Two types of intermediate systems are illustrated in FIG. 2, namely intermediate system 200 and intermediate system 201.

Partner 100 and cooperating system 106 run full communication stacks, numbered from 0 to 3. Typically, in a TCP/IP model, these layers could be mapped on 0: network interface card (NIC) layer 300 and device drivers; 1: network layer 301 (IP); 2: transport layer 302 (TCP, UDP or other like ICMP); and 3; application layer (HTTP, FTP) 303.

Intermediate system 200 runs a subset of the full stack, up to the transport layer 302, and typically includes networking equipment, like routers. Intermediate system 201 runs a still smaller subset of the communication stack, including the NIC layer 300, and may include backbone equipment.

According to the present invention, the second communication channel 325, utilized by the management center 101 and the managed element 105, is integrated with the first communication channel 225. Although the management center 101 and the managed element 105 do not have any possibility of communicating directly with one another as neither is directly addressable, they are able, by "eavesdropping" on the legitimate conversation between partner 100 and the cooperating system 101 over the first communication channel 225, to receive and transmit the management information they need to exchange.

An example will illustrate the operation of the dual communication channel according to the present invention. Suppose partner 100 is part of a network operation center (NOC). The objective of partner 100 is to monitor the state of a set of web servers, one of which is the cooperating system 106. The partner 100 issues a request, such as a SNMP-request, to the cooperating system 106 in order to obtain information. The management center 101 and the managed element 105 are aware of this legitimate request because they are connected on local area networks such as LAN 110 and LAN 111 and, having their NIC set in promiscuous mode, can "see" the request. Therefore, the management center 101 and the managed element 105 are aware that an answer from the cooperating system 106 is expected.

Independently of the request sent by partner 100, the management center 101 can fabricate a request (a "fabricated" request) whose source IP address is partner 100 and whose destination address is cooperating system 106, and can push this "fabricated" request onto the network. Such a "fabricated" request, so termed to distinguish it from the legitimate request already sent by the partner 100, includes a marker (MK) which indicated a relationship with the management center 101. As a legitimate packet, the "fabricated" request of management center 101 is routed to the cooperating system 106. The managed element 105, eavesdropping on the network, detects the marker (MK) of the management center 101 and, by trapping the packet, obtains the request.

In the other direction, independently of the answer supplied by the cooperating system 106, the managed element 105 can fabricate an answer (a "fabricated" answer) whose source IP address is the cooperating system 106 and whose destination address is the partner 100, and can push this "fabricated" answer onto the network. Such a "fabricated" answer, so termed to distinguish it from the legitimate answer sent by the cooperating system 106, includes a marker (MK) which indicates a relationship with the managed element 105. As a legitimate packet, the "fabricated" answer of the managed element 105 is routed back to the partner 100. The management center, eavesdropping on the network, recognizes the marker (MK) of the managed element 105 and, by trapping the packet, obtains the information it needs.

The marker (MK) is a means tht allows the management center 101 and the managed element 105 to filter out of the legitimate traffic of the first communication channel 225 the few network packets that will be used to transport the covert management information of the second communication channel 325. As an illustration, the partner 100 may synchronize the cooperating system 106 through the NTP protocol. In this case, the management center 101 and the managed element 105 will be configured to use this legitimate conversation to build the covert management channel and the marker (MK) will be a pattern that will retrieve all NTP network traffic (UDP port 123, TCP port 123). The traffic will be legitimate if it belongs to the first communication channel 225 and "fabricated" if it belongs to the second communication channel 325. As the volume of the network traffic of the first communication channel 225 can potentially be huge, the marker (MK) must be tuned in such a way that it will deliver a low volume but constant traffic to the management center 101 and the managed element 105.

Because the management center 101 and the managed element 105 do not have their network and transport layers enabled, the application layer of the management center 101 and of the managed element 105 needs to emulate a communication stack both to send and receive network packets. Concerning the packet reception, such an embodiment may be implemented through a Berkeley Packet Filter (BPF). In this latest case, the marker (MK) defined to filter out the network packets at the destination of the managed element 105 can be any filter supported by BPF:IP addresses, destination ports, and defined pattern used in network packet payload. The marker (MK) is initialized at installation time.

Both communication channels have their independent communication stacks as shown in FIG. 2. The first communication channel 225, used by the partner 100 and the cooperating system 106, is based on a standard TCP/IP model, using network, transport and application layers and functions. The second communication channel 325 has its independent communication stack, designated by five different communication layers: 0, A, B, C and D, and relies on the first communication channel network layer 301, and eventually transport layer 302, to transport the information it needs to communicate.

By nature, the present invention is intended to transfer small protocol data units (PDU's) between the management center 101 and the managed element 105 in a connectionless, datagram type of communication. Indeed, when the second communication channel relies on the first communication channel to serve as a vehicle for moving the PDU between peer entities, this can only be done through a single, or limited number of, datagram packets. Since a primary purpose of the invention, as implemented through the second communication channel, is to covertly manage, in a secure way, a set of passive network devices without compromising their integrity through the activation of a communication stack, the covert channel is initially intended to support control command. The underlying hardware and network type define the maximum size of a packet, including all headers, referred to as the maximum transfer unit (MTU). Typically, a packet size of a few hundred bytes is sufficient to implement the present invention.

A further recommendation of the present invention is to employ commonly used Internet protocols like NTP or HTTP to host the covert management traffic. This way, the covert management traffic is diluted into the normal traffic, the benefit thereof being that there is a high probability that the passive device will remain undetected, further of being uncompromised.

Figure 3:
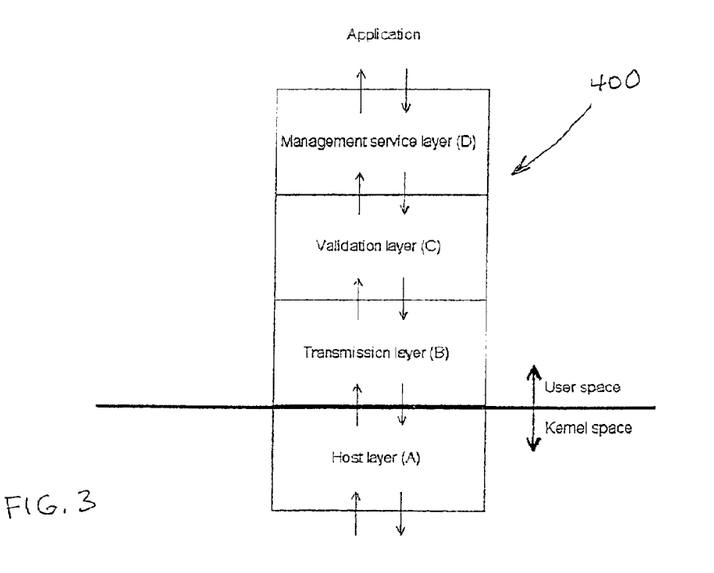
FIG. 3 is a more detailed embodiment of a protocol stack for the second communication channel of FIG. 2.

An embodiment of the protocol stack for the second communication channel, in accordance with the present invention, is shown in FIG. 3. This stack or communication model, referred to conceptually as a service provider 400, includes a plurality of communication layers including a host layer A, a transmission layer B, a validation layer C, and a management service layer D. While the number and nature of the different layers may vary, adherence with certain design principles is recommended. As an example, for simplicity the number of layers should be kept as small as possible. Each layer should have its own functions and similar functions should be placed within the same layer; specific functions should not overlap across layers. Each layer should have a set of interfaces only with adjacent layers, and it should be possible to redesign a layer without affecting adjacent layers. Finally, the implementation of the same layer specification may vary according to the hardware, the device driver, and the operating system that are used.

In compliance with the design principles just summarized, the functions of the different communication layers shown in FIG. 3 may be defined as follows.

The function of the management service layer D is to maintain a covert management general context between the management center 101 and the managed element 105 by maintaining a sequence number. The management service layer D also provides management service header information like version, source and destination address.

The function of the validation layer C is to provide authentication, integrity and privacy. Based on standard algorithms, the validation layer C calculates a message authentication code (MAC) and a packet key (PK), and encrypts/decrypts the payload received from the adjacent upper/lower layers.

The function of the transmission layer B is to provide functions to convert the encrypted payload from binary to ASCII and back, as well as generic functions to build the packet that needs to be sent to the peer host. The transmission layer B may also be divided into two adjacent sublayers, namely transmission and transport sublayers. A transport layer specification may be needed should the amount of data to be transferred between peer entities be large or should the quality of services be guaranteed.

The function of the host layer A is to provide an interface to the local host device driver and hardware to send and receive network packets. In most implementations, the host layer A runs in kernel space while the other communication layers run in user space. The host layer may be implemented using a Berkeley UNIX BPF filter.

Figure 4:
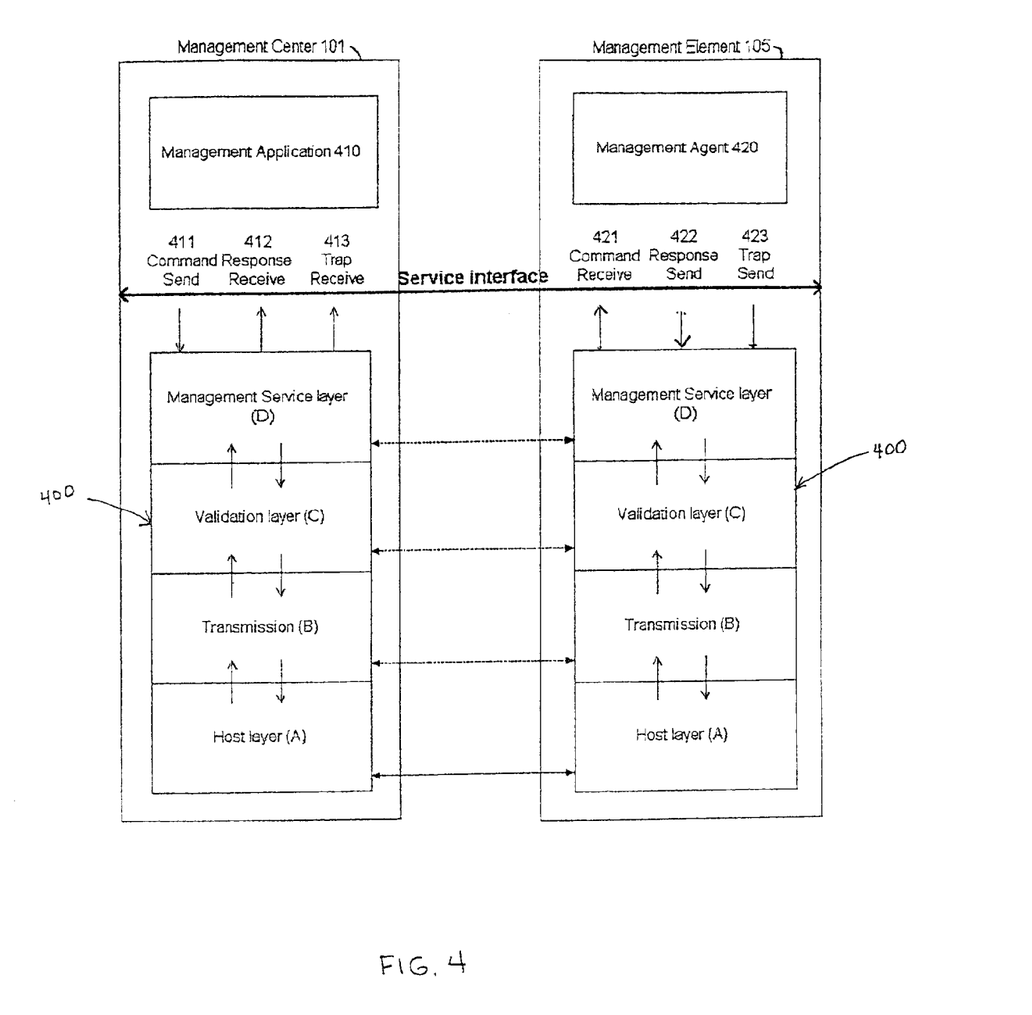
FIG. 4 depicts the minimal set of primitives of the service interface for the second communication channel of FIG. 3.

A minimal implementation of the present invention is illustrated in FIG. 4. In order for the management center 101 and the managed element 105 to communicate, the management center 101 runs an application process referred to as the management application 410 and the managed element 105 runs an application process referred to as the management agent 420. The service interface used by the management application 410 and the management agent 420 defines six primitives, namely the Command Send 411, the Response Receive 412, the Trap Receive 413, the Command Receive 421, the Response Send 422, and the Trap Send 423.

As in any communication model, there is a logical transmission between the peer layers of the communication stack but the physical communication occurs at the lowest level of the communication stack or service provider 400, i.e., at the host layer A.

Figure 5:
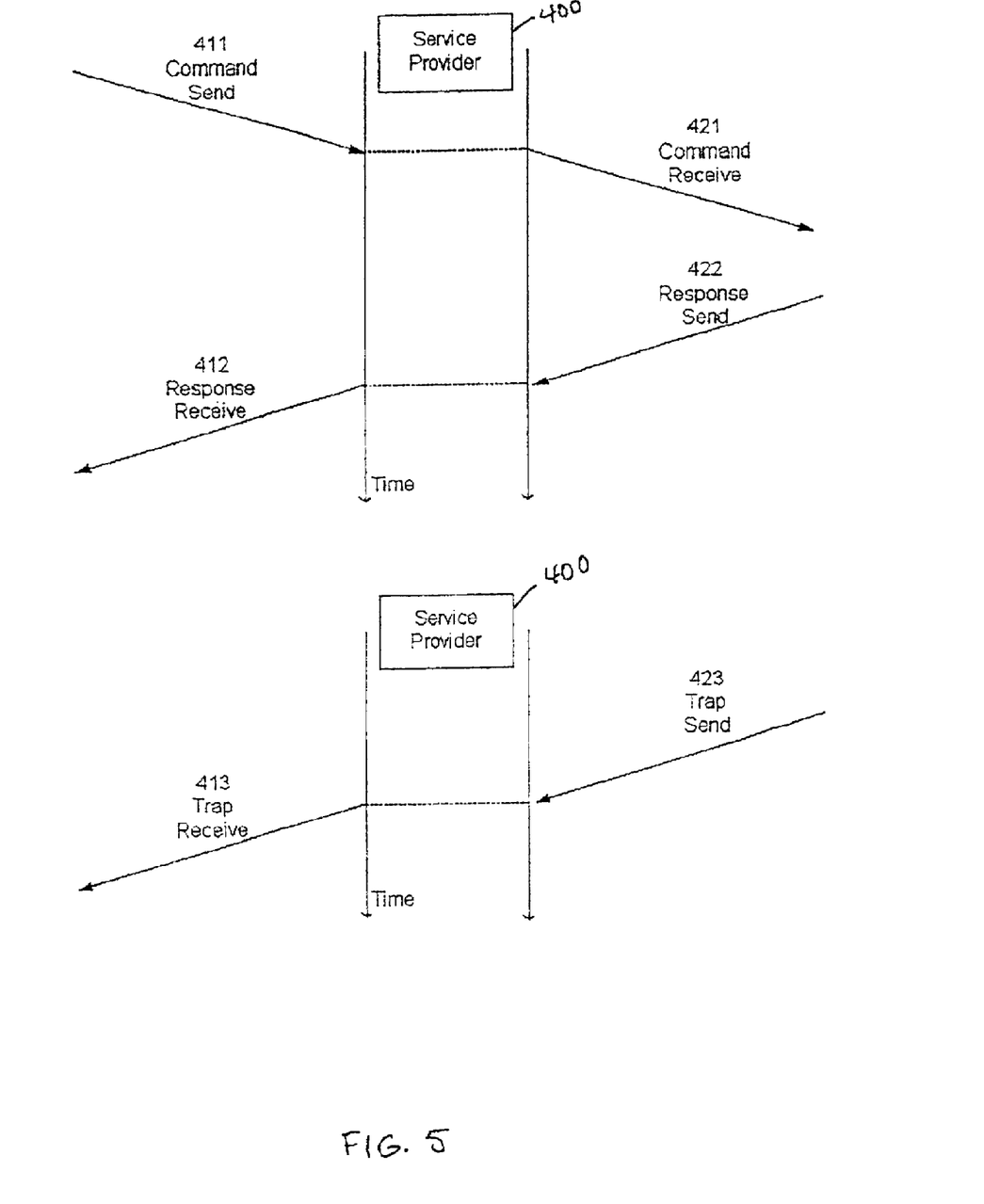
FIG. 5 presents a time diagram of the service primitives of FIG. 4.

The time sequence diagrams of FIG. 5 present the sequence of events that take place in the order of their relative positions on the vertical time lines. The management application 410 sends a Command Send request 411 to the service provider 400 through the service interface. The service provider 400 transmits the Command Send request 411 to the management agent 420 which, in turn, prepares the Response Send 422 and submits it to the service provider 400 through the service interface. The management application 410 receives the Response Receive 412 from the service provider 400. Should the management agent 420 wish to communicate some unsolicited information to the management application 410, the agent 420 issues a Trap Send 423 to the service provider 400, which the management application 410 will receive through the Trap Receive 413 primitive.

Figure 6:
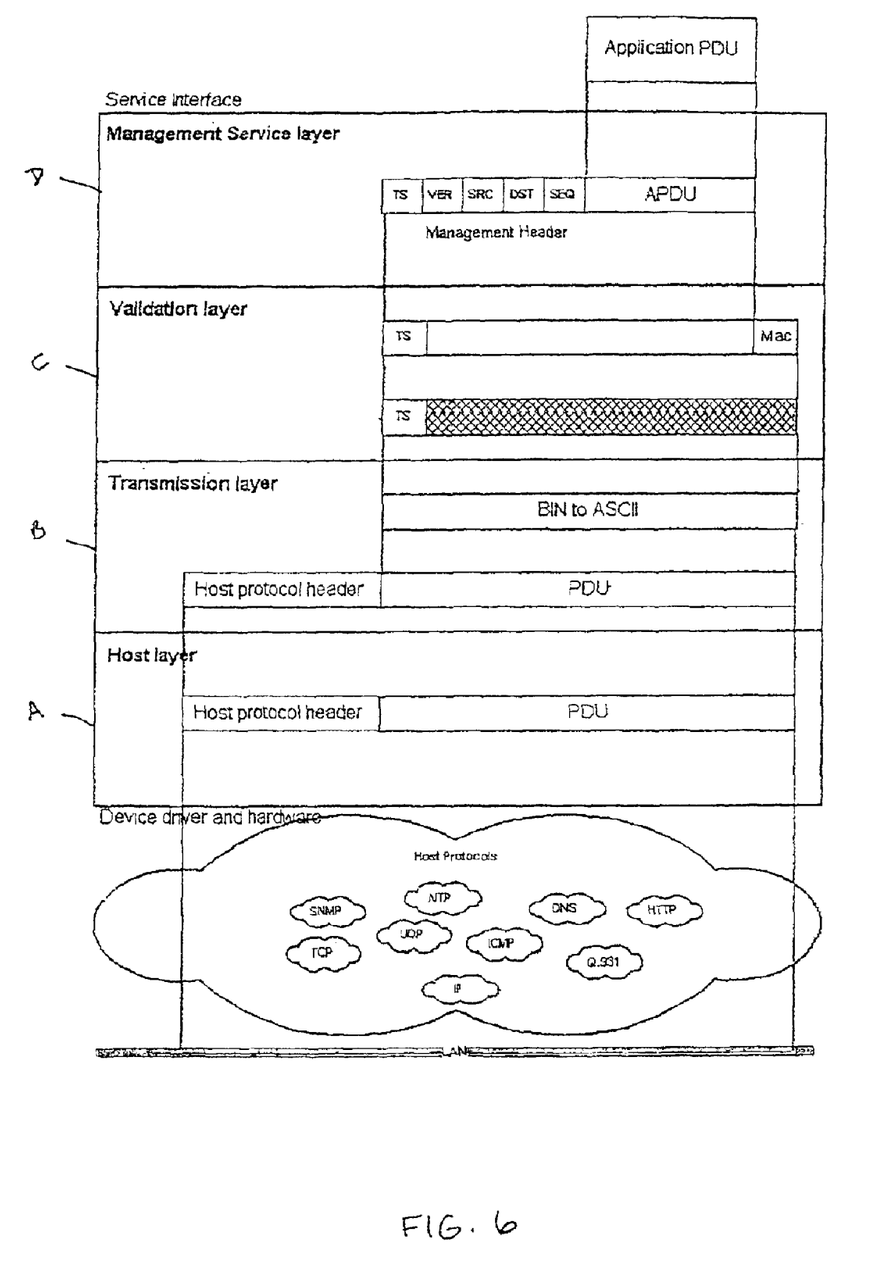
FIG. 6 illustrates the APDU layering and encapsulation within the communication stacks of the second communication channel according to the present invention.

FIG. 6 gives a detailed view of how each communication layer transforms the Application Protocol Data Unit (APDU), when each communication layer fulfills its function.

The management service layer D receives an APDU and concatenates the management header to the APDU. The management header includes a timestamp (TS), the version (VER) of the management service layer, the source (SRC) and the destination addresses (DST), and a sequence number (SEQ).

The timestamp is essential to the management of passive network devices because, at a minimum, it is required to correlate events; it may also be used to compute a packet key. Therefore, any communication between the management center 101 and the managed element 105 is timestamped.

The version of the management service layer is required to guarantee upward compatibility. It is preferred to represent the version in one byte. The four first bits are dedicated to the major version number and the four last bits to the minor version number.

Each passive network device, whether part of the management center 101 or the managed element 105, receives a unique address. More specifically, the address is a unique characteristic of the management service layer of a particular device, by analogy with an IP address which is the unique characteristic of the first communication channel 225. Addresses of both communication channels are assigned independently.

The assignment of IP addresses to the devices of the first communication channel 225 (namely, the partner 100 and the cooperating system 106) is a prerequisite of the second communication channel 325. This assignment complies with the standard Internet connectivity practices, meaning that two devices will be able to establish a standard TCP/IP conversation on the required ports, with whatever firewall, router, etc., reconfiguration(s) being implied.

The assignment of addresses to the passive devices of the second communication channel 325 cannot be completely defined in the present invention because it depends upon the management model of the passive devices. Generally, the unique address can be initialized in one of two ways. Should the managed element 105 be an appliance that is completely pre-installed and configured by a single vendor, the vendor, who is in control of the full address range, will pre-configure the unique address. In some instances, the vendor can also pre-configure the unique address of the management center (s) 101. Should the managed element 105 be an appliance delivered by several vendors, however, the unique address will typically be initialized at configuration time and delivered by the authority that has the full address range under its control. The initialization of the passive device will have to take these two scenarios into account.

The sequence number is a global counter maintained by the management service layer of the management center 101 and of the managed element 105. As earlier stated, a primary purpose of this invention is to communicate small control commands/responses. Therefore, the sequence number is primarily used to track and check whether commands, responses or traps have been lost.

The present invention proposes a communication model where commands, responses and traps will inevitably be lost since there is no possible guarantee on the Quality of Service (QoS), which is a characteristic of the first communication channel. Therefore, the management service layer is responsible for repeating the commands until it receives an acknowledgment. An acknowledgment of a Command Send 411 consists of a Response Receive 412. An acknowledgment of a Trap Send 423 cannot be fully specified in the present invention because it depends on the nature of the passive device. It can include a Command Send 411, a reconfiguration of an active device, or a manual intervention of an operator on the passive device, whose effect is to reset the Trap Send 423 condition. The management service layer D passes the management header and the APDU to the validation layer C.

The validation layer C offers complementary functions, depending upon whether it is sending or receiving a packet. If it sends a packet, it appends a Message Authentication Code (MAC), computes a packet key and encrypts the packet. If it receives a packet, it computes a packet key, decrypts the message using the MAC, and checks validity.

It is the responsibility of the supplier of the passive network devices to define the encryption schemes that will be supported by such devices. Due to the characteristics of the second communication channel, manual IPSEC is a basic requirement.

The validation layer C passes an encrypted buffer in binary format to the transmission layer B. Like the validation layer C, the transmission layer B offers complementary functions, depending upon whether it is sending or receiving a packet. If a packet is being sent, the transmission layer B first transforms the binary buffer into an ASCII machine-independent format. It then builds a network packet that contains the ASCII buffer and that is in a suitable format for the host layer A; this transformation is detailed in FIG. 7a. The network packet is passed to the host layer A. If the transmission layer B receives a network packet from the host layer A, the transmission layer first extracts the ASCII payload from the network packet, converts the ASCII buffer into a binary buffer and transfers it to the validation layer, as detailed in FIG. 7b. The host layer does not perform any data transformation. Equipped with an emitter 20 and a receptor 30, the host layer A provides an interface between the other communication layers of the service provider 400 and the local device driver and hardware.

Figure 7A:
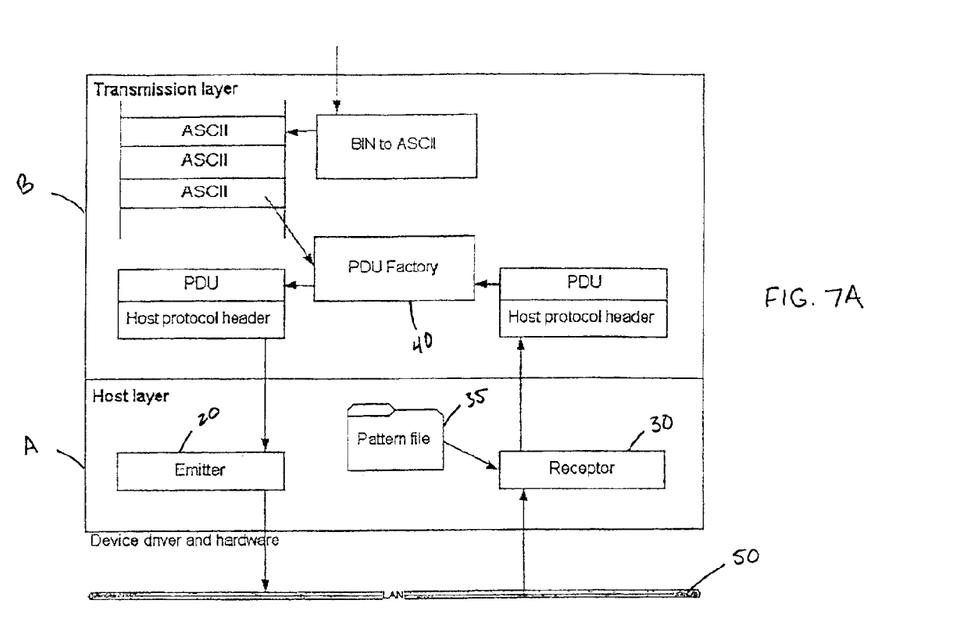
FIG. 7a presents the coupling between transmission and host layers (emission) within the communication stacks of the second communication channel according to the present invention.

FIG. 7a presents in greater detail how the transmission and host layers integrate to send a PDU to a passive network device. An example will be used for illustration. If the transmission layer receives a packet to be transferred, the transmission layer transforms the binary buffer into ASCII and copies this PDU into the transmit queue where the PDU awaits transmission.

Figure 7B:
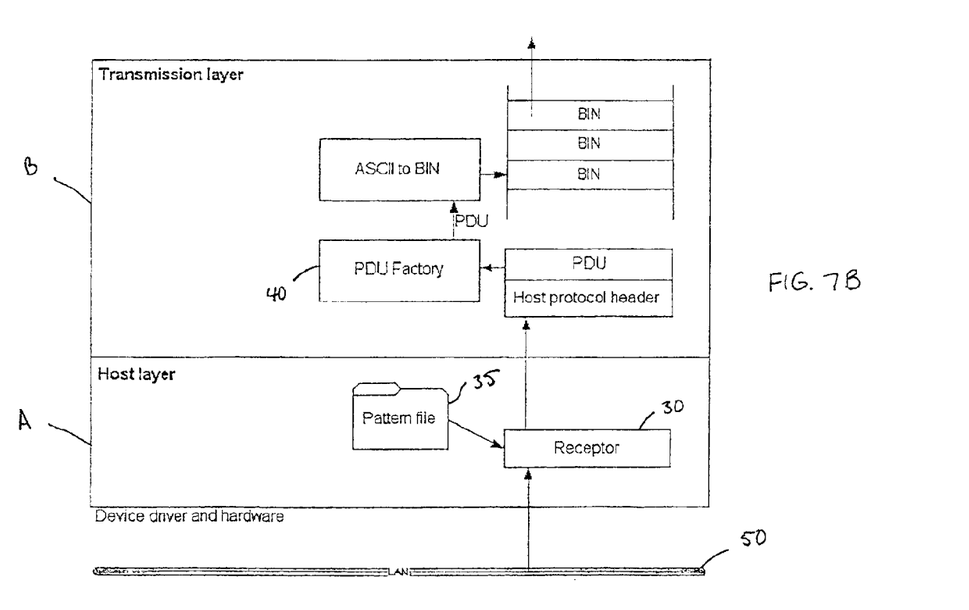
FIG. 7b illustrates the coupling between transmission and host layers (reception) within the communication stacks of the second communication channel according to the present invention.

FIG. 7b presents in greater detail how the transmission and host layers integrate to receive a PDU from the passive network device. The receptor 30 of the host layer A constantly monitors the network 50 and filters out packets that match a set of predefined patterns that define the marker (MK); the patterns may be stored in a pattern file 35. When the receptor 30 of the host layer filters out a packet, it sends it to the PDU factory 40 of the transmission layer B. The PDU factory 40 decides if the packet is an emission signal or a received PDU. In the first case, if the transmit queue is not empty, the PDU factory 40 builds a network packet and sends it to the emitter 20 of the host layer A. In the second case, the received PDU is passed to the ASCII to binary generic function, transformed into BIN and inserted into the reception queue, where it is then passed to the validation layer C.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific samples disclosed or the exact construction and operation shown and described. Rather, all suitable modifications and equivalents may be resorted to, falling within the scope of the invention.

What is claimed is:

1. A system for managing a passive network device from a remote location over a distributed computer network, comprising:

a partner device in communication with a cooperating device over a data network using a first communication channel;

a managed element connected to said data network and listening to data traffic on said data network, said managed element being transparent to said data network;

a management center connected to said data network and listening to data traffic on said data network, said management center being transparent to said data network;

said managed element and said management center exchanging data units with one another only indirectly over a second communication channel integrated with said first communication channel, said data units being sent through said first communication channel addressed to at least one of said partner device and said cooperating device and being trapped by at least one of said managed element and said management center through the second communication channel.

2. The system as set forth in claim 1, wherein said partner device communicates with said cooperating device through a plurality of intermediate systems.

3. The system as set forth in claim 1, wherein said managed element is a passive network device.

4. The system as set forth in claim 2, wherein said partner device and said cooperating device run full communication stacks, and each of said plurality of intermediate systems runs a subset of said full communication stacks.

5. The system as set forth in claim 4, wherein said full communication stacks include a network interface card, a network layer, a transport layer and an application layer.

6. The system as set forth in claim 5, wherein said subset of said intermediate systems includes a network interface card and a network layer.

7. The system as set forth in claim 5, wherein said subset of said intermediate systems includes a network interface card, a network layer and a transport layer.

8. The system as set forth in claim 4, wherein said managed element and said management center each include a service provider having a host layer, a transmission layer, a validation layer and a management service layer.

9. The system as set forth in claim 8, wherein said management service layer concatenates a management header to a received data unit, said header including at least one of a timestamp, a source address and a destination address.

10. The system as set forth in claim 8, wherein respective application processes run by said managed element and said management center communicate with one another over a service interface which defines a plurality of primitives.

11. The system as set forth in claim 10, wherein in response to intercepting a command send primitive from said management center, said managed element replies with a response send primitive which is trapped by said management center.

12. The system as set forth in claim 10, wherein said managed element can communicate unsolicited information to said management center by conveying data addressed to one of said partner device and said cooperating device using a trap send primitive which is intercepted by said management center using a trap receive primitive.

13. A method for managing a passive network device from a remote location over a distributed computer network, comprising the steps of:

establishing a first communication channel between a partner device and a cooperating device over a data network;

connecting a managed element to said data network such that said managed element can listen to data traffic on said data network, said managed element being transparent to said data network;

connecting a management center to said data network such that said management center can listen to data traffic on said data network, said management center being transparent to said data network;

establishing a second communication channel between said managed element and said management center, said second communication channel integrated with said first communication channel;

initiating a request from said partner and directing said request to said cooperating device over said first communication channel;

detecting, by said management center and said managed element, said request;

fabricating, by said managed element, an answer to said request, said answer addressed to said partner and having a source address of said managed element;

pushing said answer onto the network; and intercepting, by said management center, said answer.

14. The method as set forth in claim 13, further comprising the steps of:

intercepting, by said managed element, a command send primitive from said management center; and     pushing, by said managed element, a response onto the network with a response send primitive which is trapped by said management center.

15. The method as set forth in claim 13, further comprising the steps of:

conveying, by said managed element, unsolicited information to said management center by conveying data addressed to one of said partner device and said cooperating device using a trap send primitive; and     intercepting, by said management center, said information through a trap receive primitive.

16. The method as set forth in claim 13, wherein each of said management center and said managed element includes a host layer, a transmission layer, a validation layer and a management service layer, said method further comprising, when sending a packet, the steps of:

concatenating, by said management service layer, a header to a data unit, said header including at least one of a timestamp, a destination address, and a source address;

forwarding the header and data unit to said validation layer;

appending an authentication code to and encrypting said packet;

passing the encrypted packet in binary format to said transmission layer;

transforming said binary format into ASCII and building a network packet suitable for said host layer;

passing the network packet to said host layer; and inserting said network packet into a transmit queue.

17. The method as set forth in claim 13, wherein each of said managed element and said management center includes a host layer, a transmission layer, a validation layer and a management service layer, said method further comprising, when receiving a packet, the steps of:

monitoring, by said host layer, the network for a packet matching a predefined pattern;

filtering out an appropriate packet;

forwarding the packet to the transmission layer;

inserting, in response to determining that the packet is a data unit, the data unit into a reception queue;

converting the data unit into binary format;

forwarding the binary data unit to said validation layer; and     computing, by said validation layer, a packet key and decrypting the data unit.

* * * * *